United States Patent [19]
Chen

[11] Patent Number: 5,956,817
[45] Date of Patent: Sep. 28, 1999

[54] STRUCTURE OF TUBE CLAMP

[76] Inventor: Dian-Tai Chen, No. 494-6, Wen-Chang Rd., Yung-Shun Tsun, Ta-Tu Hsiang, Taichung County, Taiwan

[21] Appl. No.: 09/177,974

[22] Filed: Oct. 26, 1998

[51] Int. Cl.[6] .............................. B65D 63/00; F16L 33/00
[52] U.S. Cl. ........................................... 24/274 R; 24/279
[58] Field of Search ................................. 24/274 R, 279, 24/19, 20 LS, 22

[56] References Cited

U.S. PATENT DOCUMENTS

| | | | |
|---|---|---|---|
| 4,155,574 | 5/1979 | Hulsey | 24/279 |
| 4,221,030 | 9/1980 | Bernede | 24/274 R |
| 4,887,334 | 12/1989 | Jansen et al. | 24/274 R |
| 4,993,124 | 2/1991 | Ouimet | 24/279 |
| 5,410,781 | 5/1995 | Anjos et al. | 24/274 R |
| 5,787,555 | 8/1998 | Chen | 24/274 R |

FOREIGN PATENT DOCUMENTS 0894340  4/1962  United Kingdom ................. 24/274 R

*Primary Examiner*—Victor N. Sakran
*Attorney, Agent, or Firm*—Rosenberg, Klein & Bilker

[57] ABSTRACT

A tube clamp includes a binding strap having a lead end reinforced with a reinforcing plate, a tail end, and a plurality of mounting holes at the lead end, a screw holder having a plurality of clamping plates respectively fastened to the mounting holes at the lead end of the binding strap for joining the lead end and tail end of the binding strap, and a screw mounted in the screw holder and turned to move the tail end of the binding strap relative to the lead end in tightening up the tube clamp, wherein the binding strap has plurality of transverse teeth raised from an outside wall thereof between its lead end and tail end for engagement with threads of the screw for permitting the lead end to be moved relative to the tail end upon rotation of the screw.

3 Claims, 4 Drawing Sheets

STRUCTURE OF TUBE CLAMP

BACKGROUND OF THE INVENTION

The present invention relates to a tube clamp for securing a flexible tubular member for example a hose to a rigid tubular member, and more particularly to an improved structure of tube clamp which can be efficiently and smoothly tightened up with less effort.

FIGS. 1 and 2 show a tube clamp according to the prior art. This structure of tube clamp comprises a transversely grooved binding strap 2 having an opening 4 at its lead end, a screw holder 1 fastened to the opening 4 of the binding strap 2 by its integrated clamping plates 3, and a screw 5 mounted in the screw holder 1 and turned to move the tail end E of the binding strap 2 over its lead end in tightening up the tube clamp. The screw 5 has threads 50 meshed with transverse grooves 24 at the binding strap 2. This structure of tube clamp is not satisfactory in function. One drawback of this structure of tube clamp is that the hinged clamping plates 3 of the screw holder 1 may be forced to disconnect from lead end of the binding strap 2 when the tube clamp is excessively tightened. Another drawback of this structure of tube clamp is that the formation of the transverse grooves 24 at the binding strap 2 weakens the structural strength of the binding strap 2, causing the binding strap 2 to be easily broken. Furthermore, because only about 3~4 transverse grooves 24 are maintained in mesh with the threads 50 of the screw 5 and the engagement between the transverse grooves 24 and the threads 50 does not reach the roots 51 of the threads 50, the screw 5 tends to be turned in idle. FIG. 3 shows another structure of tube clamp (U.S. Pat. No. 5,787,555, which was issued to the present inventor). This structure of tube clamp comprises a screw holder 1 having two clamping plates 3, a screw 5, and a binding strap 20. The binding strap 20 has a plurality of transverse slots 201, and an opening 4 at its one end namely the lead end. The screw holder 1 is fastened to the lead end of the binding strap 20 by its clamping plates 3. The lead end of the binding strap 20 comprises two longitudinal bridging elements 22 longitudinally disposed at two opposite sides of the opening 4, four rounded convex portions 21 in four corners of the opening 4, four rounded concave portions 23 respectively disposed between two opposite ends of the bridging elements 22 and the rounded convex portions 21, and four projecting stop portions 220 respectively and outwardly disposed at two opposite ends of the bridging elements 22. When the screw holder 1 is installed, it is stopped between the projecting stop portions 220. Therefore, the screw holder 1 does not slide when the screw 5 is turned to move the tail end E of the binding strap 20 relative to the lead end of the binding strap 20. This structure of tube clamp is functional, however it still has drawbacks. The opening 4 weakens the structural strength of the lead end of the binding strap 20, causing the lead end of the binding strap 20 to be easily deformed. Furthermore, because only about 3~4 transverse slots 24 are maintained in mesh with the threads of the screw 5, the screw 5 tends to be turned in idle.

SUMMARY OF THE INVENTION

The present invention has been accomplished to provide a tube clamp which eliminates the aforesaid drawbacks. According to one aspect of the present invention, the tube clamp comprises a binding strap having a lead end, a tail end, and a plurality of mounting holes at the lead end, a screw holder having a plurality of clamping plates respectively fastened to the mounting holes at the lead end of the binding strap for joining the lead end and tail end of the binding strap, and a screw mounted in the screw holder and turned to move the tail end of the binding strap relative to the lead end in tightening up the tube clamp, wherein the binding strap has plurality of transverse teeth raised from an outside wall thereof between its lead end and tail end for engagement with threads of the screw for permitting the lead end to be moved relative to the tail end upon rotation of the screw. According to another aspect of the present invention, the lead end of the binding strap is reinforced with a reinforcing plate so that the screw holder can fixedly be secured to the lead end of the binding strap and, stretching the binding strap does not causes the lead end of the binding strap to be damaged or disconnected from the screw holder.

DETAILED DESCRIPTION OF THE PREFERRED EMBODIMENT

Figure 1:
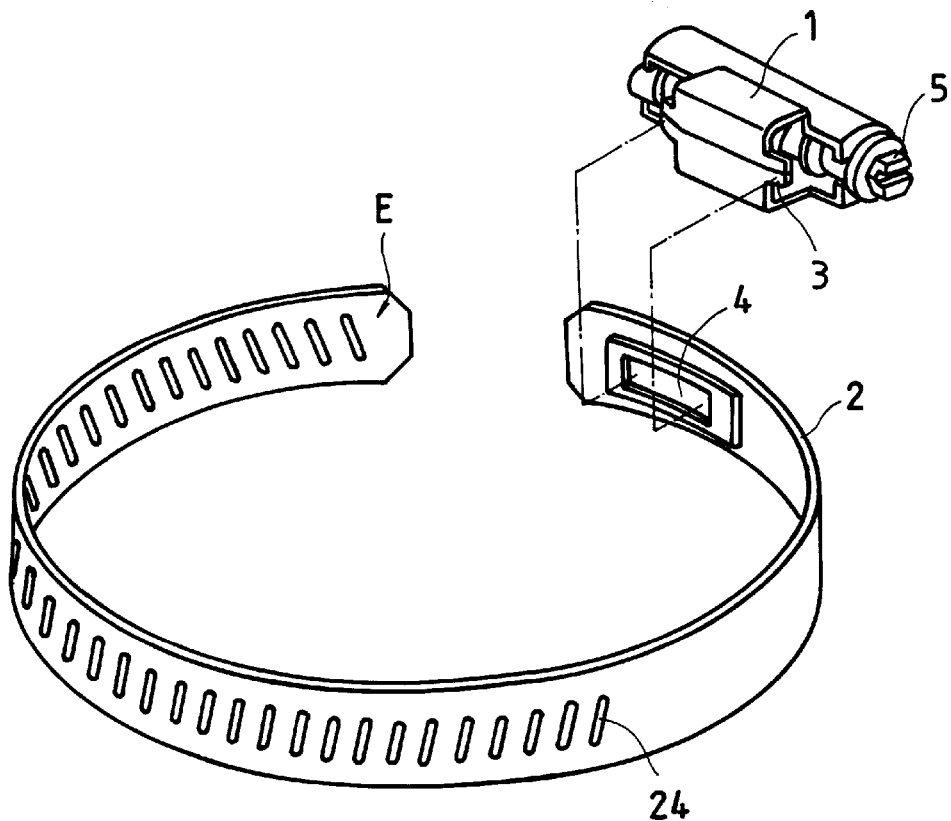
FIG. 1 is an exploded view of a tube clamp according to the prior art.
Figure 2:
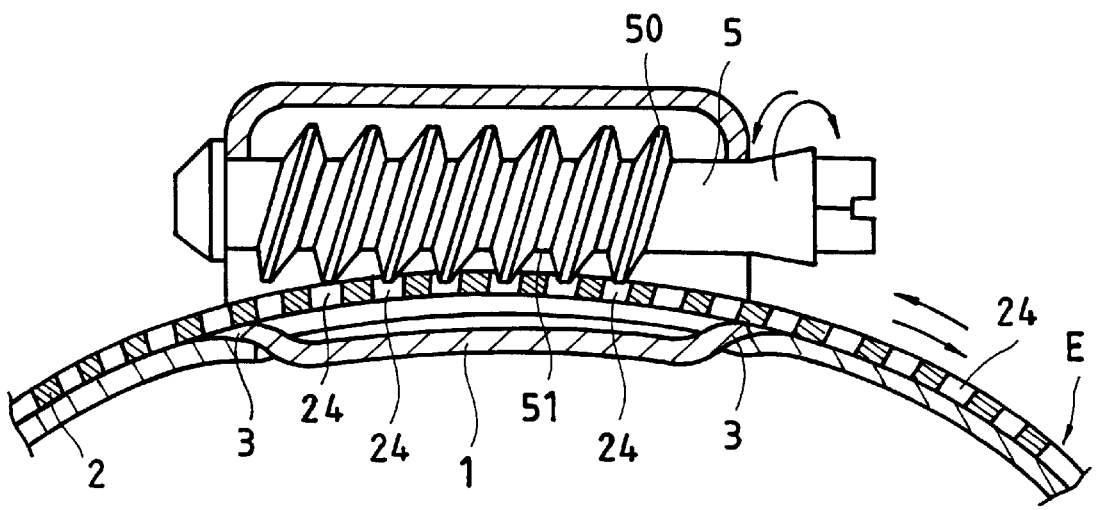
FIG. 2 is a sectional assembly view in an enlarged scale of the tube clamp shown in FIG. 1.
Figure 3:
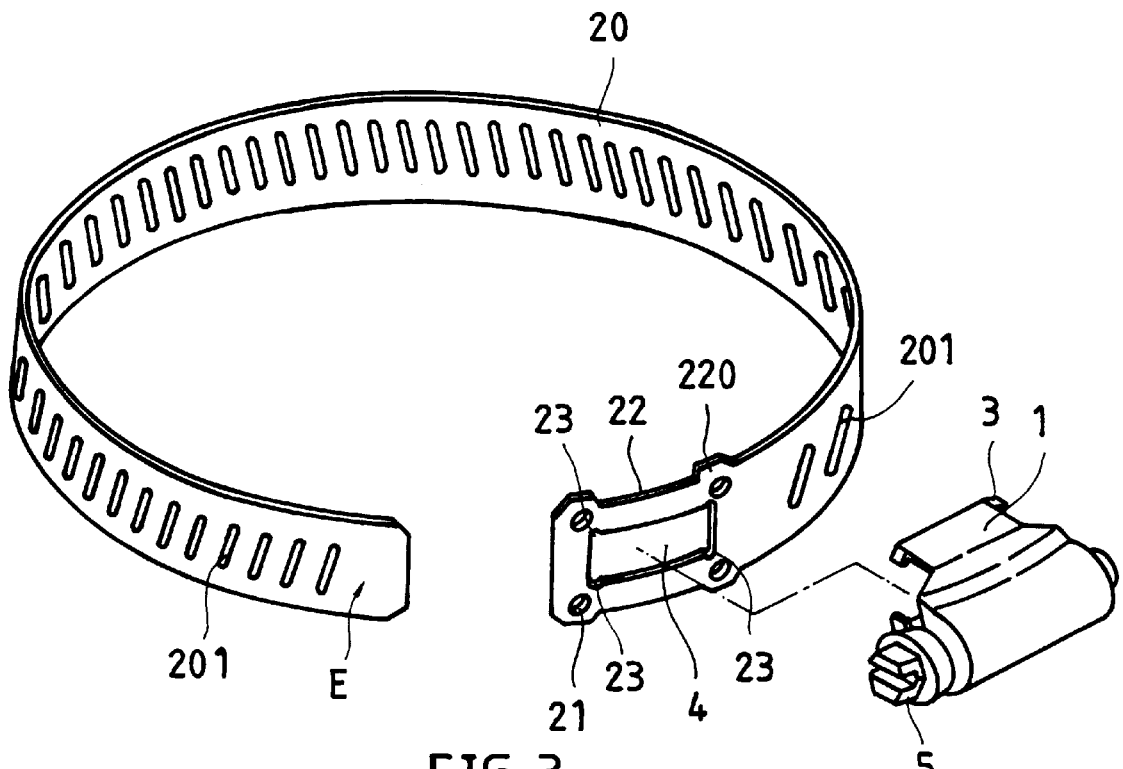
FIG. 3 is an exploded view of another structure of tube clamp according to the prior art.
Figure 4:
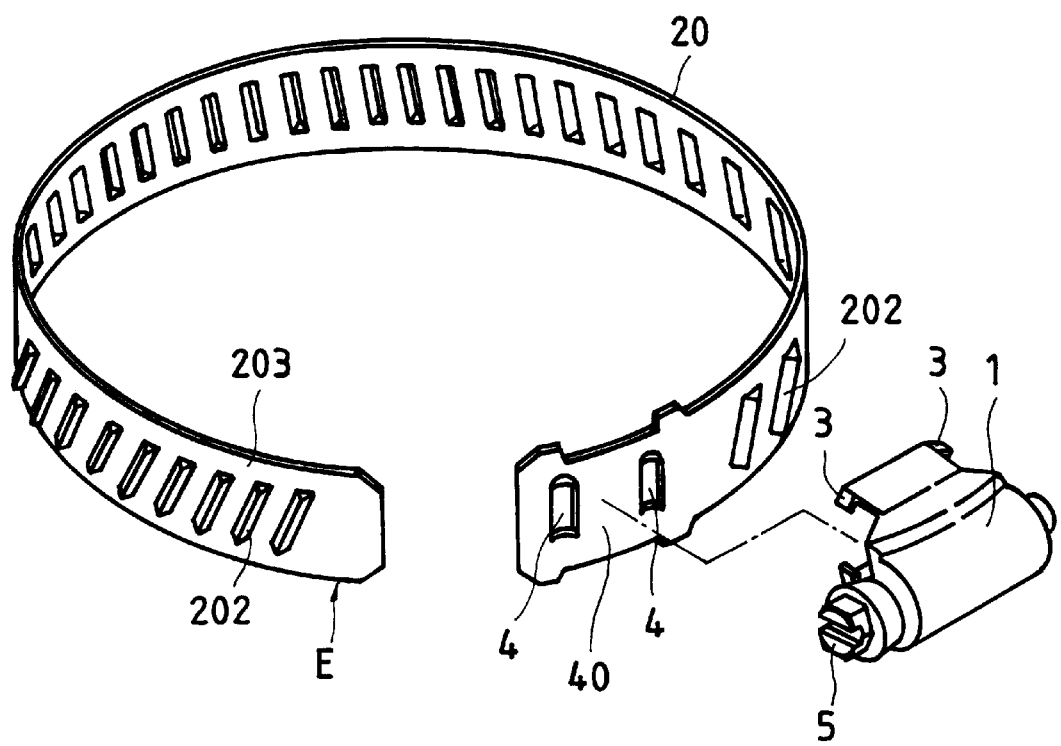
FIG. 4 is an exploded view of a tube clamp according to the present invention.

Referring to FIGS. from 4 through 6, a tube clamp in accordance with the present invention is generally comprised of a screw holder 1 having two integrated clamping plates 3, a screw 5, and a binding strap 20. The clamping plates 3 of the screw holder 1 are inserted through respective through holes 4 at the lead end of the binding strap 20, and then hammered down to fixedly secure the screw holder 1 to the lead end of the binding strap 20. The lead end of the binding strap 20 is reinforced with a reinforcing plate 40. The binding strap 20 comprises a plurality of equally spaced transverse teeth 202. A root of tooth 203 is defined between each two adjacent teeth 202. The transverse teeth 202 have a substantially ∧-shaped cross section.

Figure 5:
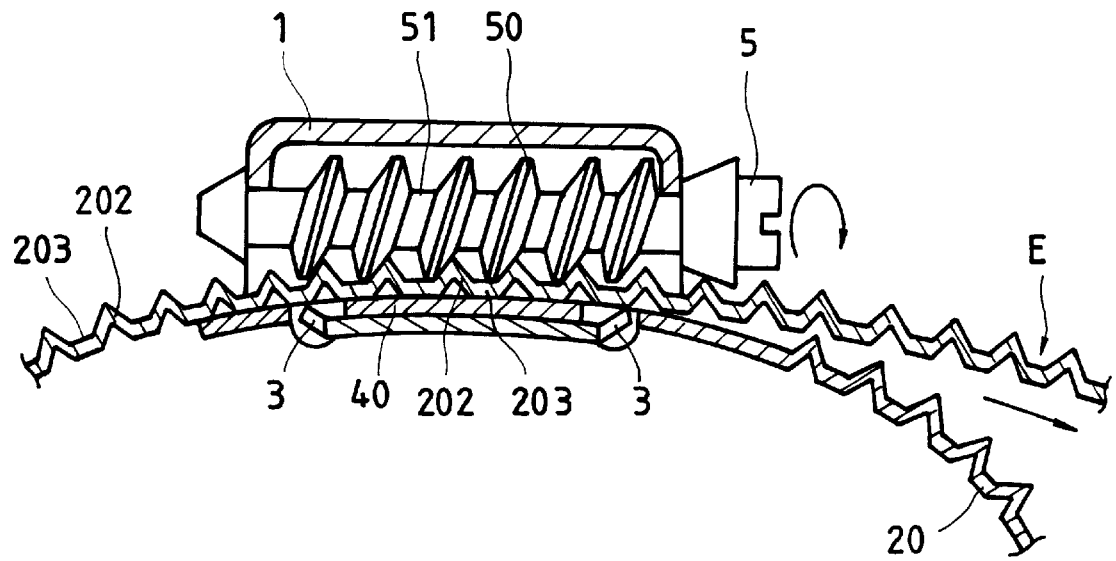
FIG. 5 is a sectional view in an enlarged scale of a part of tube clamp shown in FIG. 4, showing the screw turned, the tail end of the binding strap moved over to its lead end.
Figure 6:
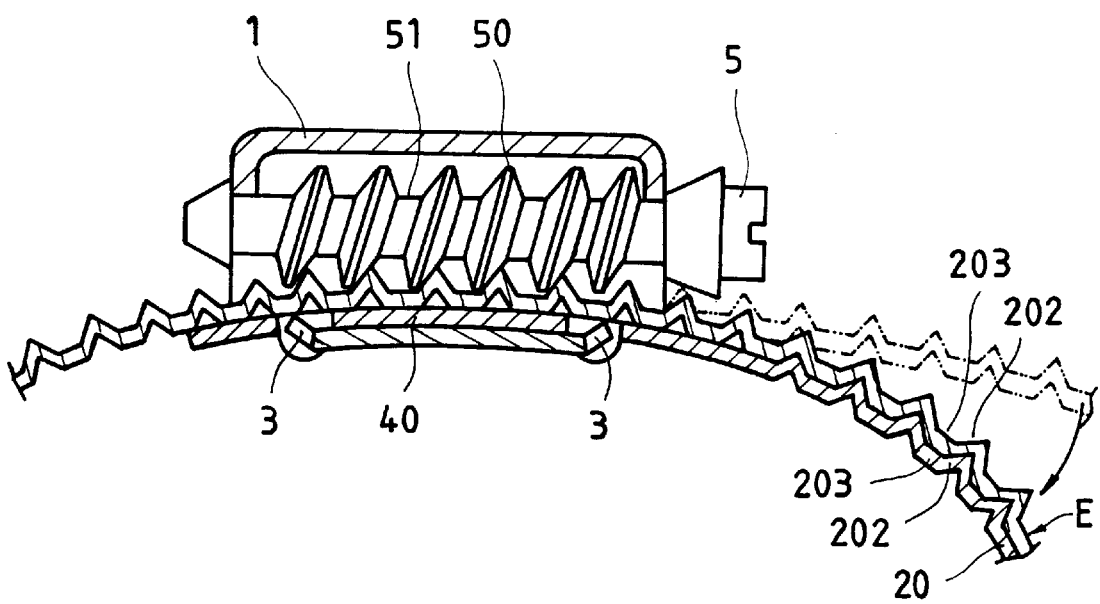
FIG. 6 is similar to FIG. 5 but showing the tail end of the binding strap meshed with a middle part of the binding strap.

Referring to FIGS. 5 and 6, when the tail end E of the binding strap 20 is inserted through the screw holder 1, the screw 5 is turned to move the tail end E of the binding strap 20, thereby causing the binding strap 20 to be tightened up. When the threads 50 of the screw 5 are meshed with the transverse teeth 203, the peaks of the threads 50 of the screw 5 are stopped at the roots 203 at the binding strap 20 and the peaks of the transverse teeth 203 are stopped at the roots 51 at the screw 5, therefore the tail end E of the binding strap 20 is positively moved with the rotation of the screw 5.

Referring to FIG. 6 again, when the tail end E of the binding strap 20 is moved through the screw holder 1, it is turned inwards and closely attached to the body of the binding strap 20, enabling the recessed bottom side of the transverse teeth 202 to be respectively engaged with the peaks of the transverse teeth 202 near the lead end of the binding strap 20. The transverse teeth 202 are formed at the binding strap 20 by stamping. Therefore, the formation of the transverse teeth 202 greatly reinforces the structural strength of the binding strap.

Figure 7:
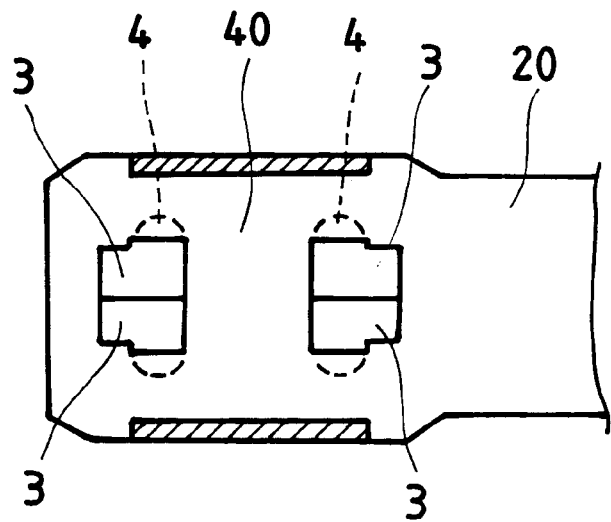
FIG. 7 is a schematic drawing showing the clamping plates fastened to the mounting holes at the lead end of the binding strap according to the present invention.
Figure 8:
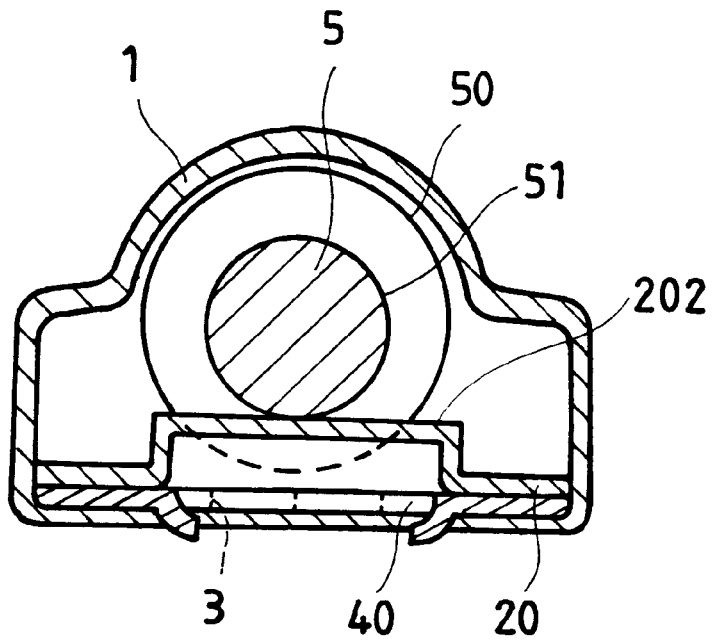
FIG. 8 is a cross sectional view showing the threads of the screw meshed with the transverse teeth of the binding strap according to the present invention.

Referring to FIGS. 7 and 8, the reinforcing plate 40 is fastened to the lead end of the binding strap 20 around the mounting holes 4. When the clamping plates 3 of the screw holder 1 are fastened to the mounting holes 4, the screw holder 1 is firmly secured to the reinforcing plate 40 and the lead end of the binding strap 20.

What the invention claimed is:

1. A tube clamp comprising:
   (a) an elongate binding strap having a lead end section, a tail end section, and an intermediate section extending therebetween in a looped configuration, said intermediate section having a plurality of transverse teeth protruding therefrom, said lead end section having a substantially planar reinforcing plate portion and having a plurality of openings formed thereabout;
   (b) a screw holder coupled to said binding strap for securing said looped configuration, said screw holder including a clamping portion substantially enveloping said reinforcing plate portion of said binding strap lead end section, said clamping portion having a plurality of clamping plates each lockingly engaging at least one said lead end section opening; and,
   (c) a screw rotatably received within said screw holder, said screw having formed thereon a plurality of threads for engaging and capturing against said screw holder reinforcing plate portion said teeth of said binding strap intermediate section, said binding strap intermediate section being advanced through said screw holder responsive to a rotation of said screw.

2. The tube clamp as recited in claim 1 wherein said teeth of said binding strap intermediate section each defines a recess therebeneath.

3. The tube clamp as recited in claim 2 wherein a first portion of said binding strap intermediate section overlaps a second portion thereof, a plurality of said teeth of said second portion respectively engaging said recesses defined beneath a plurality of said teeth of said first portion.

* * * * *